United States Patent [19]

Alessi

[11] 4,233,871

[45] Nov. 18, 1980

[54] NOTCHING TOOL

[76] Inventor: Anthony A. Alessi, 429 West Botany St., Kogarah, N.S.W. 2217, Australia

[21] Appl. No.: 933,418

[22] Filed: Aug. 14, 1978

[30] Foreign Application Priority Data

Apr. 26, 1978 [AU] Australia ............................. 4172/78

[51] Int. Cl.$^3$ ..................... B23D 17/08; B23D 21/00;
 B23D 27/00; B26D 3/14
[52] U.S. Cl. ....................................... 83/607; 83/693;
 83/917
[58] Field of Search ................. 83/917, 916, 693, 605,
 83/607

[56] References Cited

U.S. PATENT DOCUMENTS

| | | | |
|---|---|---|---|
| 350,559 | 10/1886 | Riber | 83/605 X |
| 2,363,630 | 11/1944 | Wales | 83/917 X |
| 2,496,018 | 1/1950 | Pearson | 83/607 |
| 2,619,172 | 11/1952 | Flittner | 83/917 X |
| 3,134,285 | 5/1964 | Greene | 83/607 X |
| 4,030,387 | 6/1977 | Finnimore | 83/607 X |
| 4,030,392 | 6/1977 | Torres | 83/607 X |

FOREIGN PATENT DOCUMENTS

600241 11/1925 France ........................................ 83/917

*Primary Examiner*—Frank T. Yost
*Attorney, Agent, or Firm*—Henry M. Bissell

[57] ABSTRACT

A pipe notching tool to produce a notch extending longitudinally of the pipe from an end thereof, the tool including two members pivotally interconnected, one member having a slotted die part and the other member having a blade which can be inserted in the die part as a result of relative pivotal motion between the members. The blade has a curved cutting edge which produces a continuing shear as the blade is inserted into the die so as to reduce the amount of effort required to complete the notching operation.

7 Claims, 3 Drawing Figures

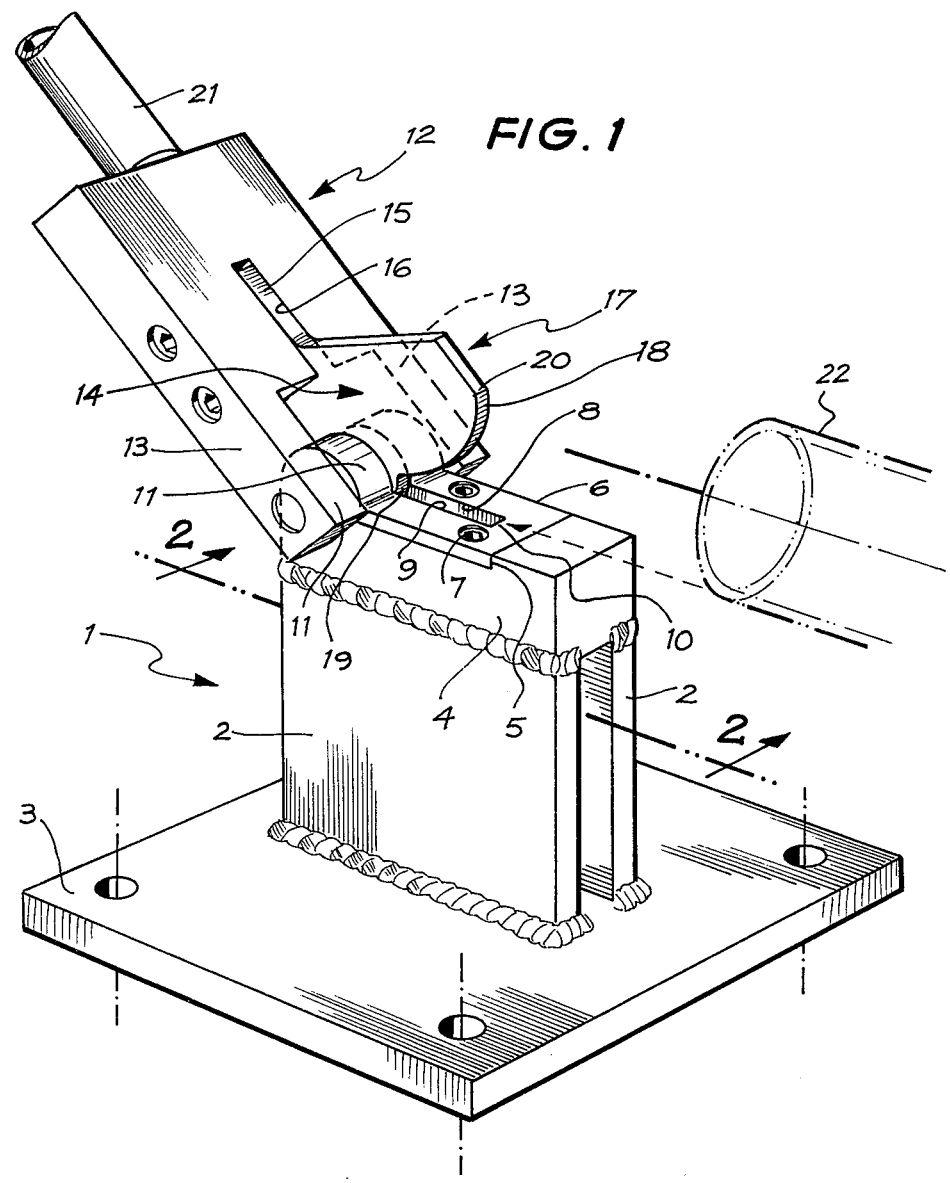

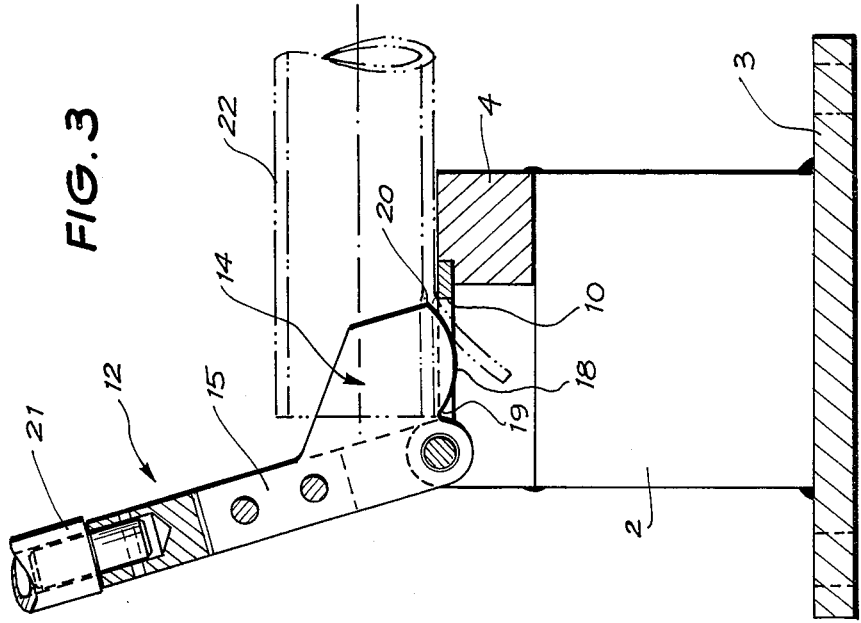
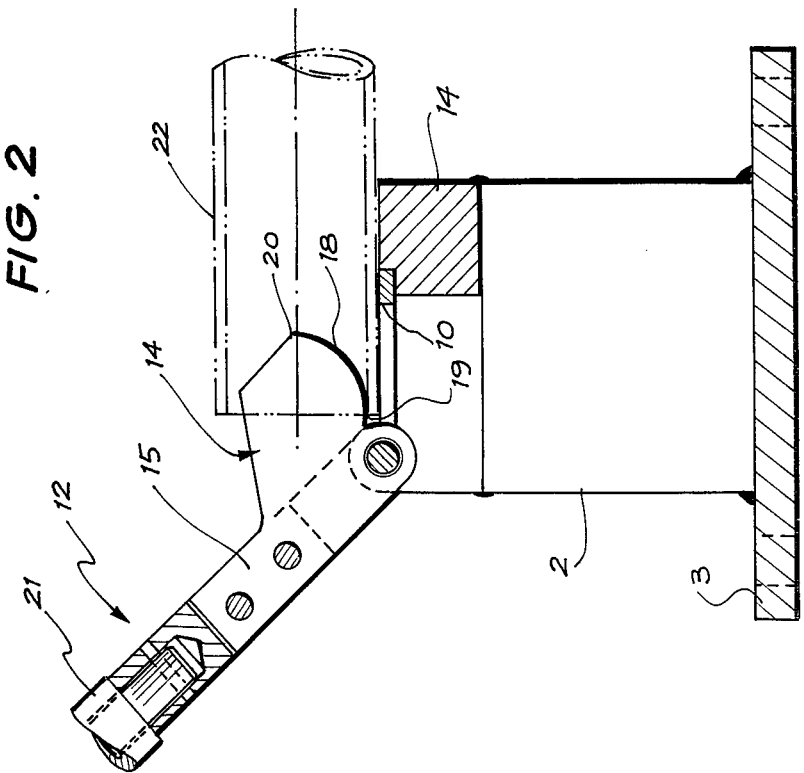

NOTCHING TOOL

This invention relates to apparatus to longitudinally notch the end of a pipe.

In the construction and assembly of exhaust pipelines for motor vehicles or other engines it is common to enter the up-stream end of a length of pipe of the pipeline into the down-stream end of the preceeding length of pipe in the pipeline. The joint between the interconnected lengths of pipe is then sealed to make the joint gasproof. In order to proceed as above it is also common to expand the said down-stream end and split the expanded portion to allow clamping means to draw the said down-stream end into close gas tight engagement with the pipe end housed in the expanded portion.

The splitting of the expanded portion has commonly been done by notching out narrow longitudinal portions of the pipe, working from the exterior to the interior of the pipe. A burr results on the inside of the pipe when notching in this manner and this burr presents an assembly problem. The problem arises out of the fact that the expansion of the pipe is usually only sufficient to receive the end of the pipe to be engaged therein with a minimum of clearance. The removal of the burr to permit assembly is a manual or, at best, a part mechanical operation and involves man-time the cost of which has to be built into the overall cost of constructing the pipeline.

This invention overcomes the above problem by providing a notching tool which operates from the inside to the outside of the pipe thereby leaving the pipe interior adjacent the edges of the notches free from burrs.

A preferred embodiment of the invention will be described hereinafter with reference to the accompanying drawings in which:

FIG. 1 is a perspective view of the notching tool of the present invention,

FIG. 2 is a sectional view along line 2—2 of the notching tool as illustrated in the FIG. 1, and FIG. 3 is a section along line 2—2 of the notching tool in an advanced stage in a notching operation.

In the drawings the notching tool comprises a base 1 comprised of two vertical walls 2 welded to a foot plate 3. A bifurcated head 4 is welded to the walls 2. The head 4 is rebated as at 5 to receive a female blade 6 secured to the head 4 by screws 7. The female blade 6 has a slot 8 with shearing edges 9 and a shearing end 10. There are two ears 11 on the head 4 with a hole through each ear 11.

There is a blade holder 12 bifurcated at one end to provide legs 13. The legs 13 are pivotally connected by a pivot pin to the two ears 11. A male blade 14 has a shank 15 mounted in a slot 16 in the blade holder 12 and screws secure the blade shank 15 in the slot 16. The male blade also includes a cutting portion 17 which includes a hole which embraces the pivot pin. A convexly curved shearing edge 18 extends from a step 19 at the leading end of the shearing edge 18 to the trailing end 20 of the male blade cutting portion 17. The step 19 permits the end of a pipe to be notched to be entered between the leading end of the shearing edge 18 and the female blade 6 when the blade holder 12 is pivoted to the open, pipe-receiving condition shown in FIGS. 1 and 2. Movement of the blade holder 12 from the position shown in FIGS. 1 and 2 through a tool closing phase (as shown in FIG. 3) to a closed, notch completing position, by application of a force to the handle 21, causes shearing action between the opposed corners of the shearing edge 18 of the male blade cutting portion 17 and the shearing edges 9 of the female blade 6 and the trailing end 20 of the male blade cutting portion 17 and the shearing end 10 of the female blade 6. The portion sheared from the pipe drops through the bifurcation of the head 4 into a discharge position between the legs 12 from whence scrap metal can be removed.

It is to be noted that the male blade cutting portion 17 is dimensioned to fit into the end of the pipe 22 and the height of the step 19 is sufficient to receive the thickness of the pipe 22 to be notched.

It is to be noted also that the arrangements of the parts is such that there is a continuously advancing point contact of the corners of the shearing edge 18 of the male blade and the shearing edges 9 of the slot in the female blade to provide a progressive point shearing action. This arrangement decreases the effort required to effect shearing. The step 19 ensures initial penetration of the leading end of the male blade cutting edge 18 into the material of the pipe as the initial shearing contact of the male blade with the pipe is one involving a major force vector which is substantially at 90° to the female blade. This prevents the pipe from moving longitudinally away from the pivot pin as is likely with a shearing action having a force vector in a direction at an angle to the female blade other than substantially 90°. The latter situation would arise if a scissor type shear was attempted.

Other aspects of the invention are the removability of the male and female blades, this permits servicing of the blades should they require repair or replacement, as for example if chipping occurs during use. The pin by passing through the hole in the male blade stabilises the male blade and proivdes resistance against the reaction forces resulting from the notching of the pipe.

Whilst the foregoing description illustrates a replacable female blade it would be possible to have the head 4 manufactured from a piece of tool-type steel which was heat treated to the degree required to perform the cutting requirements.

I claim:

1. A pipe notching tool to produce a notch extending longitudinally of the pipe from an end thereof, said tool comprising a first member, a second member and a pivot pin pivotally connecting lugs on the first member and holes in the second member, the first member including a base affixed to a column and means for removably mounting a female blade on the first member, a uniform width slot in the female blade extending away from the pivot pin and having two shearing sides and a shearing end remote from the pivot pin, a head affixed to the column, said head containing the lugs, said lugs provided with aligned pivot pin holes, the second member further including a blade holder having aligned pivot pin holes, and means for removably securing a male blade in a slot in the holder said blade being positionable to enter the end of a pipe to be notched, said male blade being aligned with the slot of the female blade so as to enter therein on a closing relative pivotal movement between the first and second members to cause a shearing action between opposed corners of a shearing edge of the male blade and the shearing sides of the female blade slot and a shearing action between a trailing end of the male blade and the shearing end of the female blade slot, said shearing edge of said male blade being convexly curved with the convex curve extending from a leading end of the male shearing edge to said trailing end of the male blade, the leading end of the male blade shearing edge being spaced from the female blade by an amount at least equal to the thickness of the wall of the pipe to be notched to permit the pipe wall to pass between the female blade and the leading end of the male blade shearing edge when the first and second members are pivoted to an open pipe-receiving relationship, and means for causing the male blade to initially contact the pipe to be notched in a direction substantially perpendicular to the surface of the pipe.

2. The tool of claim 1 wherein said column is hollow.

3. The tool of claim 1 wherein the male blade includes a hole through which the pivot pin passes.

4. The tool of claim 1 wherein the first member includes the base, a pair of legs welded to the base, a bifurcated head welded to the legs, a rebate in the head, the female blade being U-shaped and housed in the rebate, fastening means to removably secure the female blade to the head, lugs on the head and aligned pivot pin holes in the lugs; wherein the second member is a blade holder bifurcated to provide two legs having aligned pivot pin holes in the legs of the blade holder, the pivot pin passing through the holes of the legs and the holes of the lugs; and wherein the second member includes a blade slot in the blade holder, a shank on the male blade which is located in the blade slot of the blade holder, fastening means fastening the male blade in the blade slot of the blade holder, a blade body part including a hole to encircle the pivot pin, and a cutting part of the male blade incorporating the shearing edge of the male blade.

5. A pipe notching tool for longitudinally notching pipe ends comprising:
    (a) a base member having a column attached thereto;
    (b) a bifurcated head mounted on said column having means for securing female blade members thereon, said blade members including first and second shearing spaced-apart sides and a shearing end;
    (c) a second member including male blade means having cutting edges matched with said first and second sides and said shearing end of said female blade members, and being convexly arcurate along its cutting edges such that the direction of motion of the initial contact between said blade means and a pipe being notched is substantially 90 degrees, said male blade means being removably secured in a slot in the holder and being insertable in the pipe to be notched; and
    (d) pivot means pivotally interconnecting said head and said second member through aligned lugs on said head and holes in said blade holder, the blades being aligned so that pivoting of the pivot means causes a shearing action between edges on the male blade and the sides of the female blade, and between the trailing end of the male blade and the end of the female blade, the blades being spaced apart in the pipe-receiving condition by a distance at least equal to the wall thickness of the pipe to be notched.

6. The tool of claim 5 wherein said male blade means is removably mounted in said second member.

7. The tool of claim 6 wherein said second member including said male blade means is pivotally interconnected with said head.

* * * * *